United States Patent [19]

Renfro

[11] Patent Number: 4,518,148

[45] Date of Patent: May 21, 1985

[54] HYDRAULIC CHOKE DEVICE

[76] Inventor: Wesley E. Renfro, P.O. Box 1320, Houma, La. 70360

[21] Appl. No.: 437,734

[22] Filed: Oct. 29, 1982

Related U.S. Application Data

[63] Continuation-in-part of Ser. No. 160,972, Sep. 26, 1980.

[51] Int. Cl.³ .................. F16K 47/04; F16K 31/05; F16H 1/08
[52] U.S. Cl. .................................. 251/122; 251/130; 251/363; 137/797; 137/312; 74/625; 74/424.8 NA; 74/424.8 VA
[58] Field of Search ............... 251/122, 130, 319, 360, 251/363; 137/797, 312; 74/216.3, 424.8 VA, 424.8 NA, 625; 138/45

[56] References Cited

U.S. PATENT DOCUMENTS

| | | | |
|---|---|---|---|
| 2,061,852 | 11/1936 | Schweitzer | 251/122 |
| 2,324,571 | 7/1943 | Fitz | 251/130 X |
| 2,327,980 | 8/1943 | Bryant | 74/625 X |
| 2,614,795 | 10/1952 | Allen | 251/122 X |
| 2,843,152 | 7/1958 | Laird et al. | 137/797 |
| 2,914,088 | 11/1959 | Beaman et al. | 251/266 X |
| 3,466,945 | 9/1969 | McNeal, Jr. | 74/625 |
| 3,521,853 | 7/1970 | Gillis et al. | 251/122 |
| 4,047,695 | 9/1973 | Cleveland et al. | 138/46 X |
| 4,295,384 | 10/1981 | Brandt et al. | 74/424.8 NA |

FOREIGN PATENT DOCUMENTS

| | | | |
|---|---|---|---|
| 295651 | 8/1925 | United Kingdom | 251/360 |
| 1288028 | 9/1972 | United Kingdom | 251/122 |

Primary Examiner—Arnold Rosenthal
Attorney, Agent, or Firm—William David Kiesel

[57] ABSTRACT

A hydraulic choking device for use in controlling fluid flow from an oil or gas well, having an improved valve chamber and valve design to reduce parts' wear and facilitate repairs, wherein the chamber is provided with a cavity within the chamber passageway sidewall to which the fluids are initially directed and wherein a ball nose plug is utilized as the valve gate to seal the valve.

7 Claims, 9 Drawing Figures

HYDRAULIC CHOKE DEVICE

RELATED APPLICATIONS

This application is a continuation-in-part of U.S. patent application Ser. No. 160,972, filed Sept. 26, 1980, by the inventor herein, and entitled "Hydraulic Choke Device", mention of which is made to obtain benefit of its earlier filing date.

BACKGROUND OF THE INVENTION

1. Field of the Invention

This invention relates in general to high pressure fluid choke devices and, more particularly, to choke devices designed for use on oil and gas wells.

2. Prior Art

One of the most potentially dangerous and expensive situations faced by the petrochemical industry has been prevention of well blowouts. In order to prevent well blowouts, much research and development time and money has been expended to design high pressure fluid choke devices. The most popular devices are those presently marketed by NL Industries, Inc., as described in their publication NLS 4881-580, Dresser Industries, as described in their Bulletin No. E-53031-BC, and Patterson Service, Inc. as described in their publication entitled, "When Yor Are Caught Under Pressure . . . Patterson Adjustable Choke". However, these and similar choke devices have experienced rapid deterioration of wear sleeves and other internal parts, long downtime for repairs, difficulty in handling fluid surges through chokes, or require too great of hydraulic pressure to operate the choke. Furthermore, the prior art devices are not equipped with backup systems in case the hydraulic system goes down because of cut cables or power outages.

SUMMARY OF THE INVENTION

Therefore, it is an object of this invention to provide a hydraulic choke device designed to increase the longevity of its internal components.

Another object of this invention is to provide a hydraulic choke device designed for ease and quick repair of worn out or broken internal components.

Still another object of this invention is to provide a hydraulic choke device that requires less hydraulic pressure to operate.

A still further object of this invention is to provide a hydraulic choke device having a backup system for operating the choke device when the hydraulic system fails.

Other objects and advantages of this invention shall become apparent from the ensuing descriptions of the invention.

Accordingly, a hydraulic choking device to be installed on a high pressure fluid well member to control flow of fluids from the well is provided comprising a choke housing assembly having a choke housing body, provided with a passageway with an exit opening at one end at a ball nose plug entrance opening at its opposite end, wherein the passageway is provided with a cavity in its sidewall perpendicular to the passageway, a shoulder stud perpendicularly attached to the housing body and having a fluid entry passageway opening into the housing body passageway directly opposite the cavity, wherein the shoulder stud is attachable to the fluid well member for the fluid entry passageway to receive the well fluids, and a wear sleeve assembly attached to the choke housing body passageway sidewall at the exit opening end and having an entry wear sleeve and a downstream wear sleeve wherein the entry wear sleeve has an outwardly flared opening to receive the fluids and to direct them through the downstream wear sleeve, which is also provided with a flared opening to receive the fluids and direct them through an opening of the ball nose plug seat, an operator assembly comprising an operator housing attachable to the choke housing body and having an operator rod channel aligned with the choke housing body passageway and extending through the operator housing, an operator rod positioned in the channel and threadingly attached at one end to a threaded shaft, wherein its opposite end is extended toward the wear sleeve assembly, and a ball nose plug attached to the operator rod's opposite end and extending toward the wear sleeve assembly, wherein the plug has a ball nosed shape to sealingly seat in the ball nose plug seat when positioned therein, and a drive assembly having a drive means drivingly attached to the threaded shaft to rotate the shaft and cause the ball nose plug to advance or retract from the choke housing body passageway.

PREFERRED EMBODIMENTS OF THE INVENTION

Figure 1:
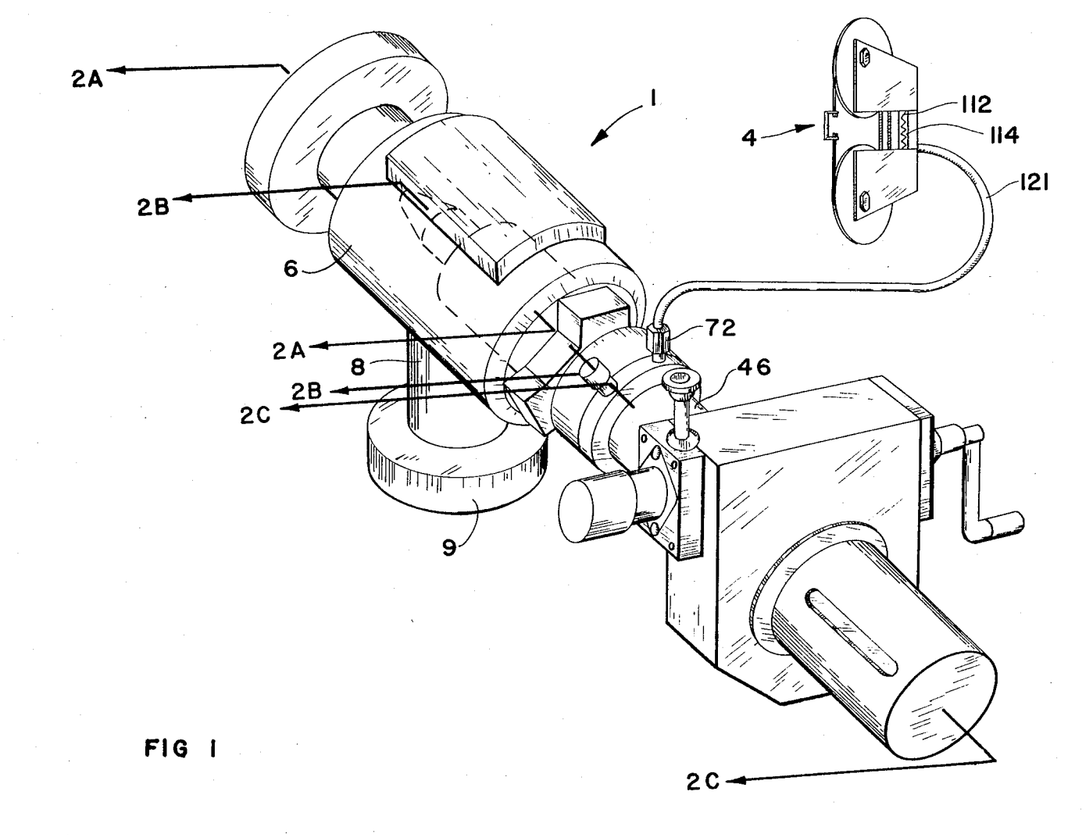
FIG. 1 is a three-dimensional view of a preferred embodiment of the invention.

Turning to FIG. 1, a preferred embodiment of the hydraulic choking device, according to this invention, is illustrated, comprising, in general, a choke housing assembly, denoted generally by the numeral 1, an operator assembly, denoted generally by the numeral 2, and a drive assembly, denoted generally by the numeral 3, and in a more preferred general embodiment, the hydraulic choking device will also comprise a fluid displacement position indicator, denoted generally by the numeral 4, and a manual override assembly, denoted generally by the numeral 5.

Figure 2A:
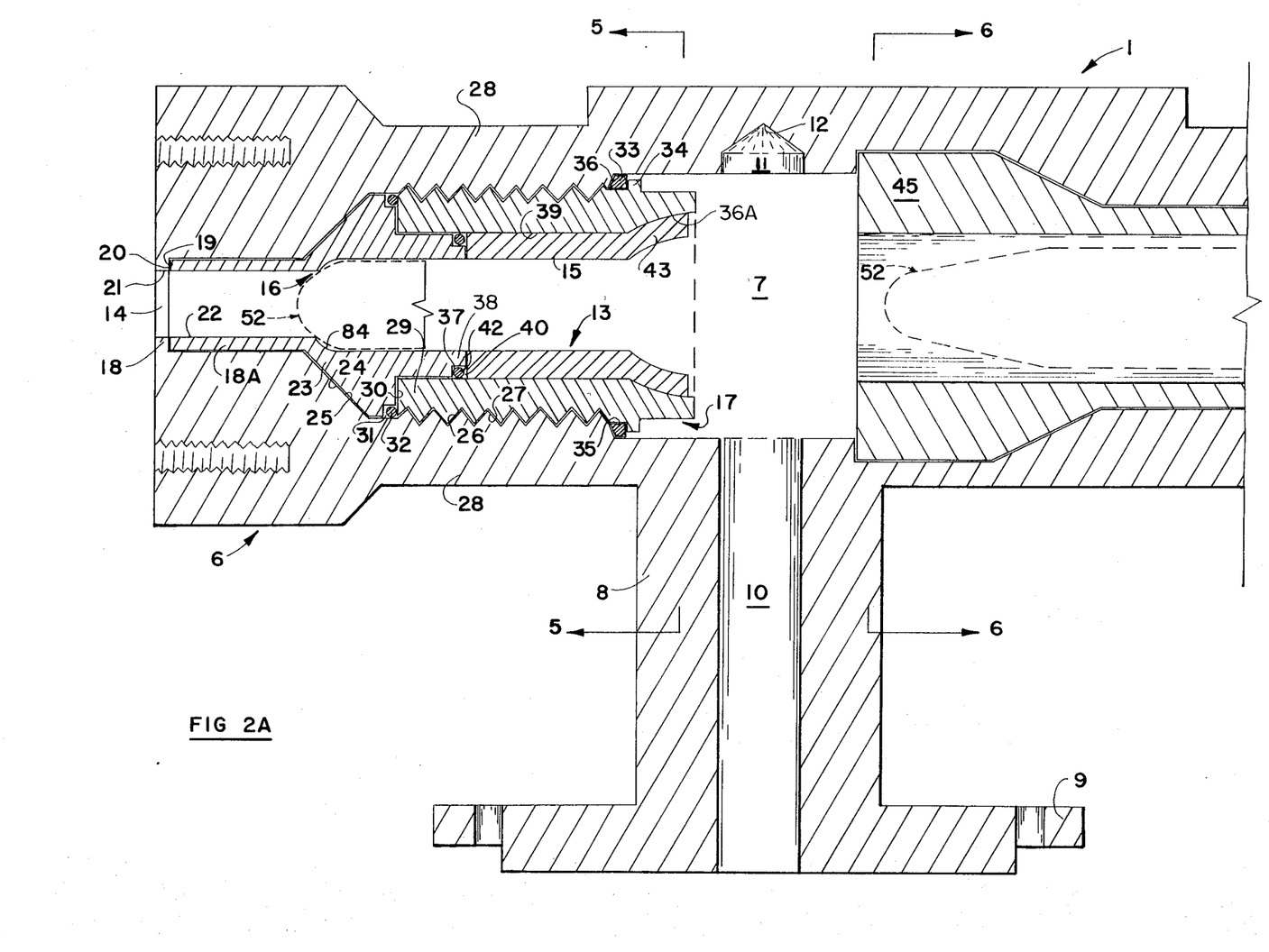
FIG. 2A is a cross-sectional view taken along lines 2A—2A of FIG. 1 showing the choke housing assembly.

The choke housing assembly 1 is provided with a choke housing body 6, having passageway 7 extending parallel to the axis of choke housing body 6. Choke housing body 6 is also provided with a shoulder stud 8 perpendicularly attached, such as by welding, to the choke housing body 6. Shoulder stud 8 has a flange 9 attached at its lower end, which flange 9 normally connects to the well manifold (not shown) and is provided with a fluid entry passageway 10 opening perpendicularly into the housing body passageway 7 and directly opposite passageway cavity 11 drilled out in passageway sidewall 12. In a preferred embodiment, cavity 11 will be conically shaped, as shown, in order to direct the fluid flow through passageway 10 into wear sleeve assembly, denoted generally by the numeral 13, in a manner designed to reduce wear of passageway wall 12.

Figure 5:
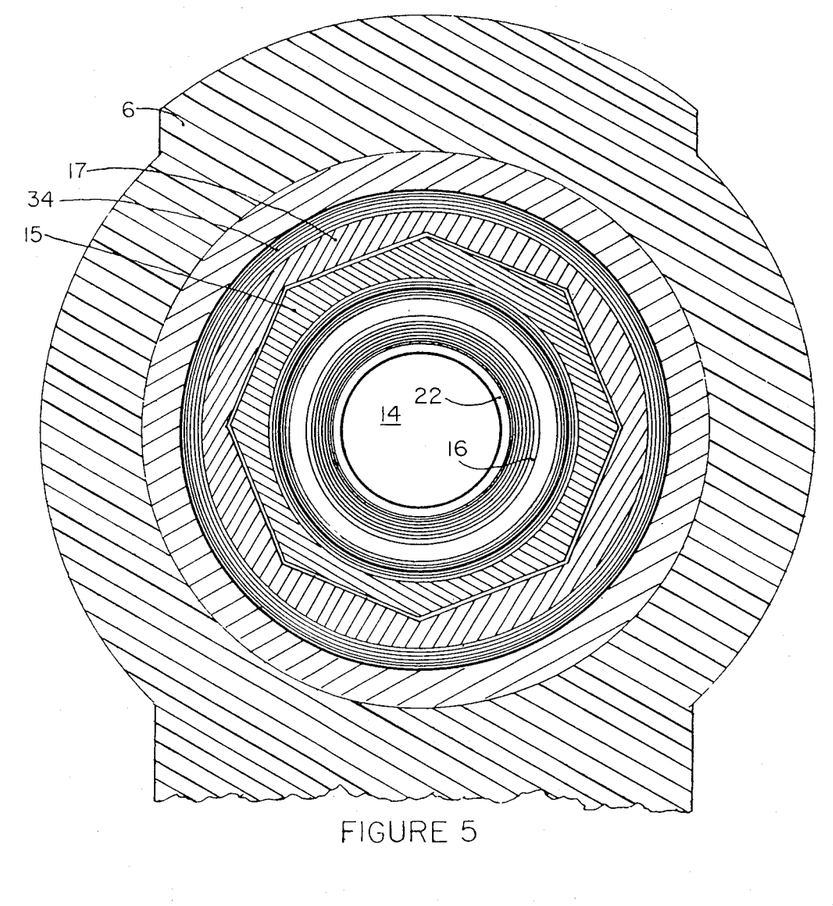
FIG. 5 is a cross-sectional view taken along lines 5—5 of FIG. 2A showing the wear sleeve housing.
Figure 6:
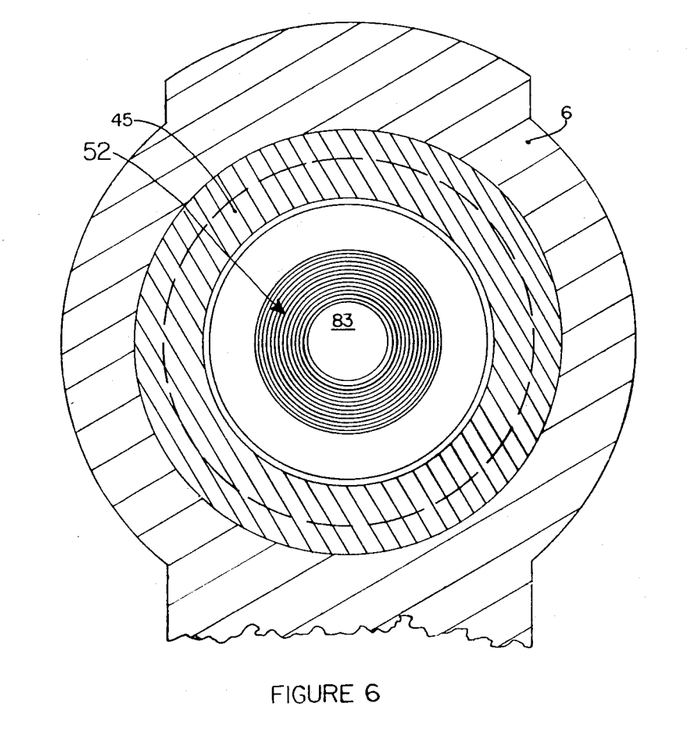
FIG. 6 is a cross-sectional view taken along lines 6—6 of FIG. 2A showing the operator rod.

Wear sleeve assembly 13 is positioned at exit opening end 14 of choke housing body 6. Assembly 13 comprises an entry wear sleeve 15 and a downstream wear sleeve 16 held in position at exit opening 14 by wear sleeve housing 17 as described below. Choke housing body 6 is provided with a circular ridge 18 extending about and forming exit opening 14. Downstream wear sleeve 16 is formed having a circular hollow rod stem 18a, having rear end surface 19 abutting flushly with ridge sidewall 20 to form a flush passageway channel formed by ridge surface 21 and downstream wear sleeve rod surface 22. Downstream wear sleeve 16 has outwardly flared section 23, whose outer circular surface 24 fits flushly against choke housing body wall surface 25. Wear sleeve housing 17, having an octagonal inner diameter cross-section as is shown in FIG. 5, is provided with exterior threads 26, which are matingly screwed into threads 27 of choke housing body wall 28 as shown in FIG. 2A. Wear sleeve housing stud 29 fits flushly against downstream wear sleeve surface 30 forcing wear sleeve 16 against choke housing body stud surface 20 as shown. In a preferred embodiment, downstream wear sleeve 16 is provided with groove 31 in flared section 23 to accommodate O-ring 32 to form a seal to prevent fluid from passing between surfaces 24 and 25. To further prevent fluid leakage, a teflon-coated steel ring 33 is positioned behind outwardly protruding wear sleeve housing shoulder member 34 and in sealing contact with wear sleeve assembly exterior wall surface 35 and choke housing body surface 36. In a preferred embodiment, wear sleeve housing 17 is provided with an outwardly flared interior cross-section to receive entry wear sleeve 15 machines to sealingly fit interior channel wall 36a of wear sleeve housing 17 as shown in FIG. 2A. In a preferred embodiment, an O-ring passageway 37 is formed by downstream wear sleeve circular stud member 38, wear sleeve housing stud walls 39, and entry wear sleeve stud walls 40 wherein O-ring 42 is housed. In a still more preferred embodiment, the downstream wear sleeve and the wear sleeve housing are constructed from a tungsten alloy to reduce the fluid wear which occurs during operation of the choke device. In another preferred embodiment, entry wear sleeve 15 is also provided with a flared end section 43 to receive the fluids flowing through passageways 10 and 7. By utilization of such flared end section, back pressure caused by the fluid flow is substantially reduced, thus allowing smaller hydraulic forces to operate the operator assembly 2 as described hereinbelow.

Figure 2B:
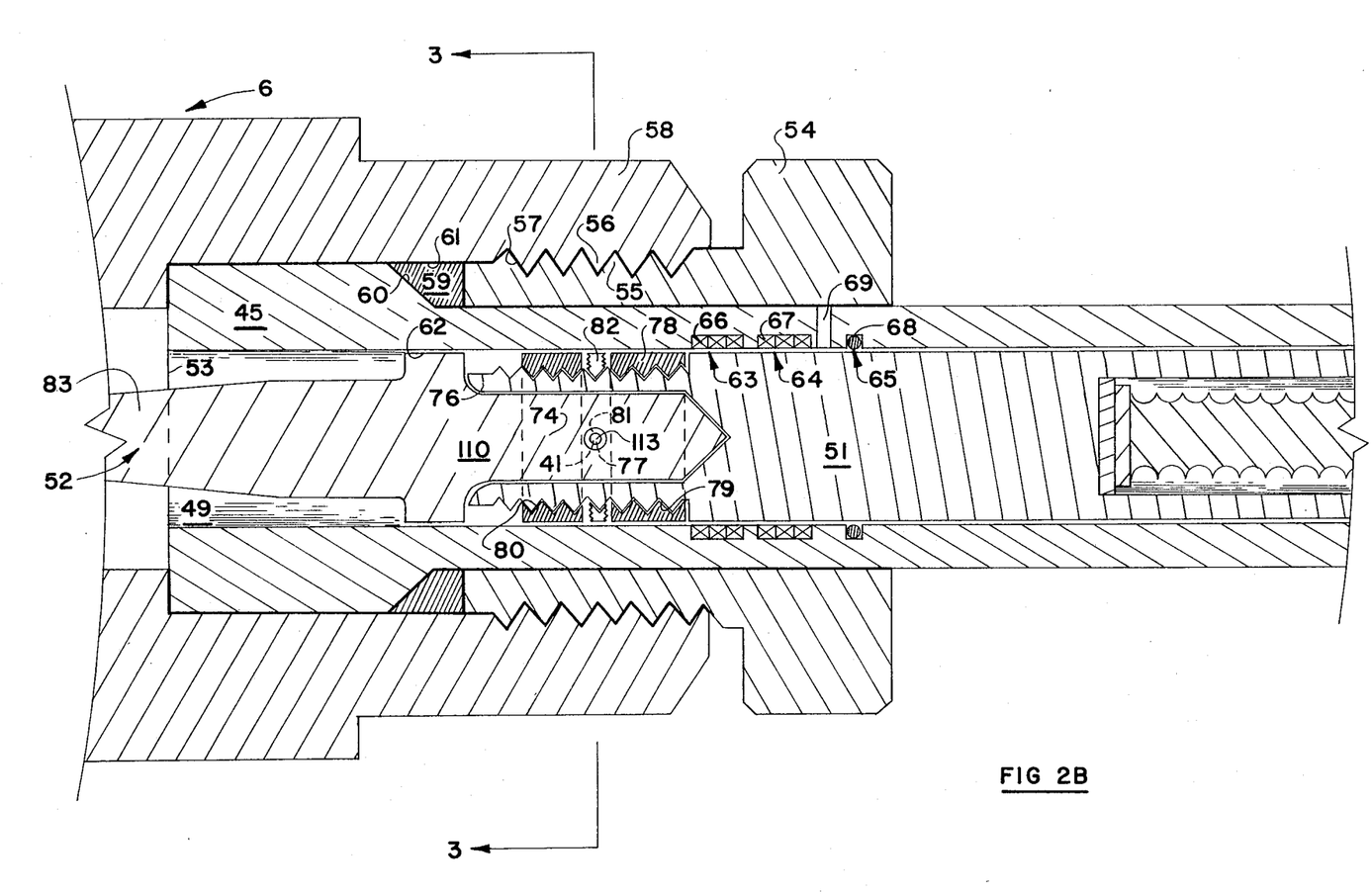
FIG. 2B is a cross-sectional view taken along lines 2B—2B of FIG. 1 showing the drive assembly.

Operator assembly 2 comprises an operator nose assembly 45 and an operator body assembly 46, which are attached to one another by mating operator nose assembly threads 47 and interior operator body assembly threads 48, as shown in the Figures. Both are provided with parallel aligned channels 49 and 50, respectively, which, together, make up the operator rod channel, through which operator rod 51 and entry ball nose plug 52 can pass. Operator nose assembly 45 is attached to choke housing body 6 at ball nose plug entrance opening 53 by hammer nut 54, which is provided with threads 55, which are matingly threaded into threads 56, located on the interior surface 57 of ball nose plug entrance section 58 of choke housing body 6. In a preferred embodiment, teflon-coated steel ring 59 is machined to provide a sealing fit between operator nose assembly exterior surface 60 and ball nose plug entrance section surface 61, as shown in the Figures. To provide for internal sealing of channel 49, operator nose assembly interior wall 62 is provided with recesses 63, 64 and 65 into which packing glands 66 and 67 and O-ring 68 are positioned as shown. In a preferred embodiment and as a safety feature, operator nose assembly 45 is provided with bleed opening 69 to allow fluid which has leaked past packing gland 66 to escape. In another preferred embodiment, stabilizer ring 70 is abutted against shoulder plate surface 71 of operator body assembly 46 where it is fixedly attached by screws 72 that pass through openings 73 in operator body assembly 46 as shown. In a more preferred embodiment, one of openings 73 provides access to fluid displacement position indicator 4 as described hereinbelow.

Operator rod 51 is provided with end cavity 110 into which fits ball nose plug stud member 74, as is described in more detail hereinbelow. Operator rod 51 is also provided with a second channel 109 drilled from the opposite end of operator rod 51 and having an internal diameter sufficiently large to allow passage of ball nut shaft 75.

Stud member 74 is provided with shear pin opening 41, fitting into cavity 110 formed by operator rod walls 76 and having operator rod shear pin opening 77 alignable with shear pin opening 41 when stud member 74 is placed in cavity 110 as shown. In a preferred embodiment, ram nut 78, having threads 70 matingly screwable onto operator rod threads 80 and also provided with ram nut shear pin opening 81 and sealing shear pin 113 in position in openings 41, 77 and 81 is provided to supply additional stability to ball nose plug 52's attachment to operator rod 51 as shown. Ram nut 78 is further securely fastened by screws 82 that are screwed down onto threads 80. Plug section 83 of ball nose plug 52 is shaped to sealingly mate with downstream wear sleeve inner surface seat 84. The utilization of the ball nose design reduces back pressure resulting from fluid flow striking ball nose plug 52 as ball nose plug 52 is moved toward downstream wear sleeve 16.

Figure 2C:
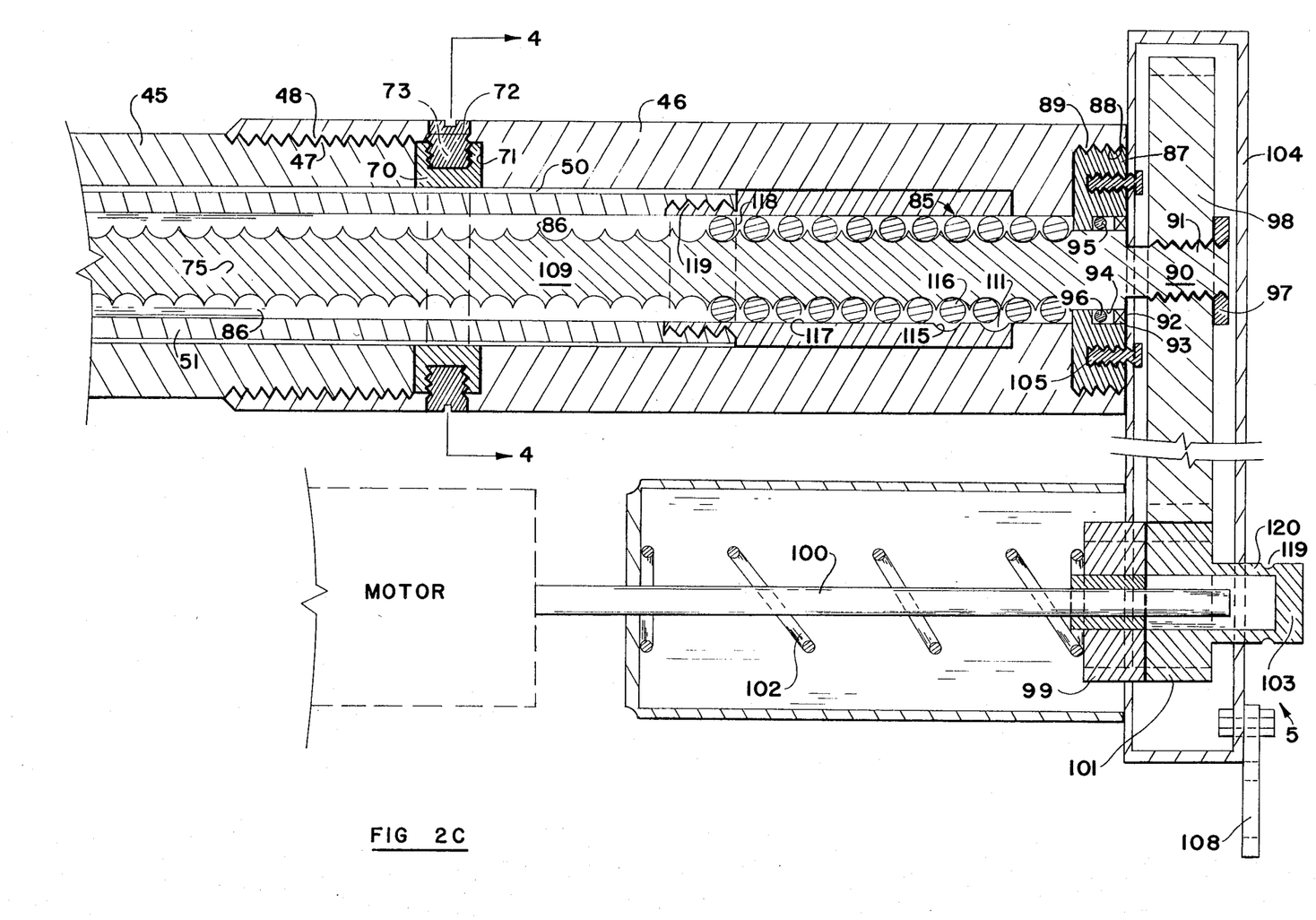
FIG. 2C is a cross-sectional view taken along lines 2C—2C of FIG. 1 showing the drive assembly.
Figure 3:
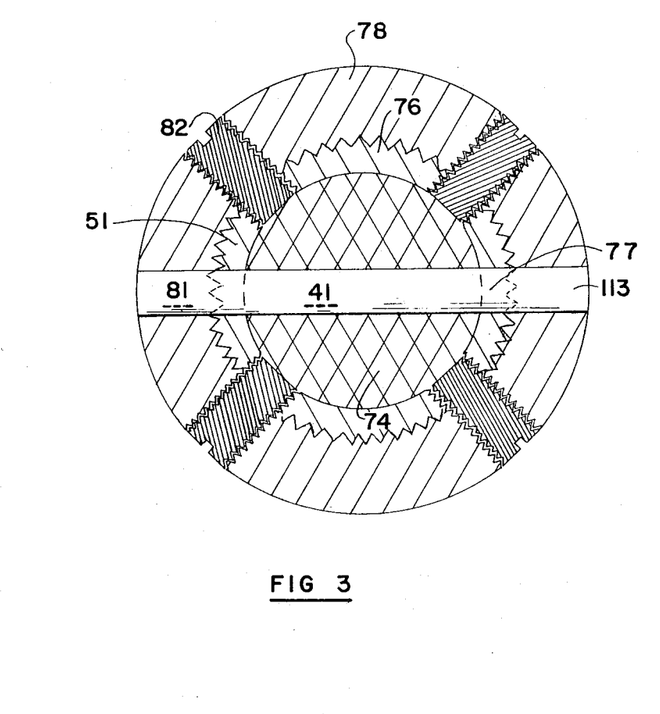
FIG. 3 is a cross-sectional view taken along lines 3—3 of FIG. 2B showing the ram nut.
Figure 4:
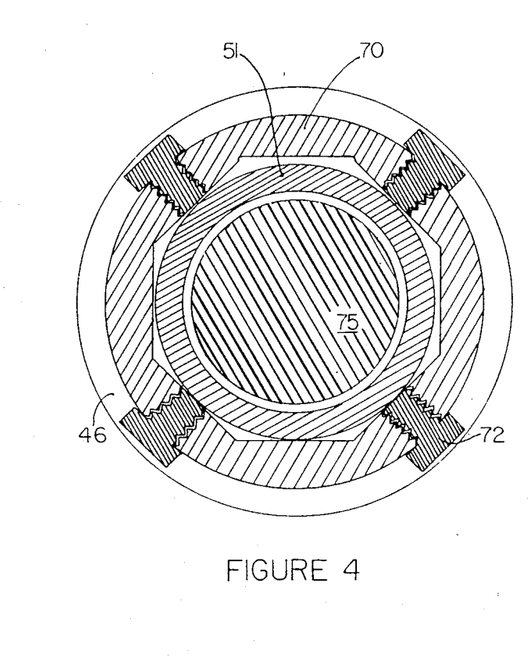
FIG.4 is a cross-sectional view taken along lines 4—4 of FIG. 2C showing the stabilizer ring.
Figure 7:
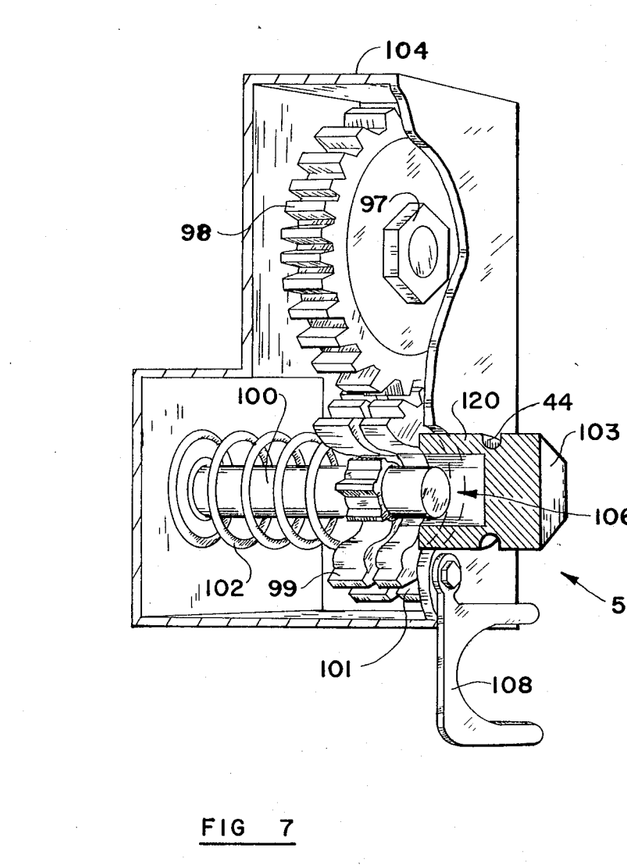
FIG. 7 is a cutaway three-dimensional view of the gear assembly and manual override gear assembly.

Ball bearing assembly 85 is held in position in operator rod channel 109 by flange 118, which is screwed to operator rod 51 by threaded end 119. Channel 109 has a recessed slot 111 to accommodate ball bearing return tubes 115. Ball bearings 116 are held securely in grooves formed by threads 86 of shaft 75 and bearing assembly wall 117. Operator end cap 87 has external threads 88 which are matingly threaded to threads 89 of operator body assembly 46 as shown. Operator end cap 87 is provided with a shaft channel 90 through which gear shaft 91 passes through packing glands 92 located in recesses formed by operator end cap surfaces 93 and 94, respectively. Ball bearings 95 are also provided in a recess formed by operator end walls 96 to assist in the rotation of shaft 91. As best seen in FIGS. 2C and 7 attached to end 97 of shaft 91 is gear 98, which meshes with drive gear 99 of drive means 3.

In a preferred embodiment, manual override assembly 5 is attached to motor shaft 100, having key member 106 to disengage gear 99 and engage manual override assembly gear 101 by pushing gear 101 against gear 99 with shaft 120 and then fitting fork member 108 into groove 44 found in shaft 120, thus locking gear 101 in operative mating position with gear 98. In manual operational position, gear 99 is no longer in contact with gear 98 in that it has been pushed against spring 102. Attachable to manual override shaft nut 103 is a turning crank or cheater bar arm (not shown.) In another preferred embodiment, to protect from dirt and other environmental conditions, gear housing 104 is fitted about gears 98, 99 and 101 and is secured in position by bolts 105, which screw into the threaded opening of operator end cap 87, as shown.

In a preferred embodiment, operator body channel 50 is filled with a hydraulic fluid, which passes through one of openings 73 to a conventional cable cylinder fluid displacement position indicator 4.

In operation, drive assembly 3 turns gear 99, which, in turn, rotates gear 98 and shaft 91 and 75. The rotation of shaft 75 turns operator rod 51 about ball bearings 116 forcing operator rod and wear plug 52 into passageway 7 restricting the fluid flow therethrough. Continued turning will result in wear plug 52 being seated in downstream wear sleeve 16 in sealing fashion shutting off the flow of fluid through the passageways. By reversing the direction of drive means 3, ball plug 52 can be retracted from downstream wear sleeve 16, again allowing passage of fluids through passageways 17 and through opening 14 of operator body 6. As operator rod 51 is moved into and out of passageways 7, hydraulic fluid flows through one of openings 73, which is not sealed by one of screws 72, through hydraulic fluid lines 121 and indicator cavity 112 causing an indicator piston (not shown) to move accordingly. Attached to indicator cylinder is indicator means 114 which registers the position of wear plug 52 in passageway 7.

There are, of course, many obvious alternate embodiments not specifically disclosed, but which are meant to be included in the definition of the invention as defined by the following claims.

What I claim is:

1. A hydraulic choking device to be installed on a high pressure fluid well member to control flow of fluids from the wells which comprises:
   (a) A choke housing assembly having:
      (i) A choke housing body provided with a passageway having an exit opening at one end and a ball nose plug entrance opening at its opposite end, the passageway being provided with a cavity in its sidewall perpendicular to the passageway, and provided with a shoulder stud perpendicularly attached to the housing body and having a fluid entry passageway opening into the housing body passageway directly opposite the cavity, the shoulder stud being attachable to the fluid well member for the fluid entry passageway to receive the well fluids,
      (ii) A wear sleeve assembly attached to the choke housing body passageway sidewall at the exit opening end and having an entry wear sleeve and a down stream wear sleeve, the entry wear sleeve having an outwardly flared opening to receive the fluids and direct them through the down stream wear sleeve which is also provided with a flared opening to receive the fluids and direct them through an opening of a ball nose plug seat;
   (b) An operator assembly having:
      (i) An operator housing assembly attachable to the choke housing body and having an operator rod channel alignable with the choke housing body passageway and extending through the operator housing assembly, wherein the operating housing assembly comprises an operator nose section screwed to the choke housing body and an operator body section attached to the operator nose section,
      (ii) An operator rod positioned in the channel and threading attached at one end to a threaded shaft, its opposite end extending toward the wear sleeve assembly, the operator nose assembly having a packing gland through which the operator rod passes in a sealing manner, wherein the operator nose assembly is provided with a weep hole located behind a packing gland to allow removal of any fluid which seeps past the packing gland, and
      (iii) A ball nose plug attached to the operator rod's opposite end and extending toward the wear sleeve assembly, the plug having a ball nose shaped to sealingly seat in the ball nose plug seat when positioned therein,
   (c) A drive assembly having a drive means drivingly attached to the threaded shaft to rotate the shaft and cause the ball nose plug to advance or retract from the choke housing body passageway.

2. A hydraulic choking device according to claim 1 wherein the opposite end of the operator rod is provided with a cavity into which the plug's rear shoulder section fits.

3. A hydraulic choking device according to claim 2 wherein the operator rod opposite end cavity has a depth greater than the plug's rear shoulder section.

4. A hydraulic choking device according to claim 1 wherein a ram nut is threadingly attached to the opposite end of the operator rod and is provided with a shear pin opening through which the shear pin can pass.

5. A hydraulic choking device according to claim 1 wherein a stabilizer ring is threadingly attached in an operator body section of the operator rod channel and provided with an opening through which the operator rod can pass, wherein the operating housing assembly comprises:
   (a) an operator nose section screwed to the choke housing body, and
   (b) an operator body section attached to the operator nose section.

6. A hydraulic choking device according to claim 1 wherein a manual gear drive assembly is operatively connectable to the gear assembly, wherein an operator end cap is threadingly attached to the rear of the operator body section, and wherein the operating housing assembly comprises:
   (a) an operator nose section screwed to the choke housing body, and
   (b) an operator body section attached to the operator nose section.

7. A hydraulic choking device according to claim 6 wherein the motor is provided with a rotatable shaft to which is attached a first gear and positioned by a spring mounted the shaft to be operatively engaged with a second gear mounted to the ball nut shaft; a manual override gear mounted on the shaft adjacent to the first gear and provided with means to push the first gear out of lockingly position the manual override gear in operating position with the second gear, and a hand-operated turning device attached to the manual override gear to rotate same.

* * * * *